United States Patent [19]

Karoly et al.

[11] 3,930,971

[45] Jan. 6, 1976

[54] COATING COMPOSITIONS

[75] Inventors: Gabriel Karoly, Springfield; John L. Gardon, Westfield, both of N.J.

[73] Assignee: M & T Chemicals Inc., Greenwich, Conn.

[22] Filed: Mar. 11, 1974

[21] Appl. No.: 449,973

Related U.S. Application Data

[63] Continuation-in-part of Ser. No. 228,317, Feb. 22, 1972, abandoned.

[52] U.S. Cl.... 204/159.11; 260/78.4 EP; 260/42.53
[51] Int. Cl.$^2$.............................................. C08F 2/50
[58] Field of Search ............................... 204/159.11

[56] References Cited

UNITED STATES PATENTS

| | | | |
|---|---|---|---|
| 3,205,157 | 9/1965 | Licari | 204/159.11 |
| 3,711,390 | 1/1973 | Feinberg | 204/159.11 |
| 3,711,391 | 1/1973 | Feinberg | 204/159.11 |
| 3,721,616 | 3/1973 | Watt | 204/159.11 |
| 3,721,617 | 3/1973 | Watt | 204/159.11 |

OTHER PUBLICATIONS

Handbook of Epoxy Resins; Henry Lee & Kris Neville; McGraw–Hill; New York, 1967 pp. 14–47 to 14–49.

*Primary Examiner*—Carman J. Seccuro
*Attorney, Agent, or Firm*—Robert P. Auber; Kenneth G. Wheeless; Robert Spector

[57] ABSTRACT

Liquid pigmented epoxide coating compositions containing one or more liquid epoxides, up to 50% by volume of pigment, one or more carboxylic acid anhydrides and specified diazonium salts of Lewis acids are converted to solid materials with substantially no weight loss following a relatively short exposure to ultraviolet radiation. The heretofore unattainable objective of a light-curable, substantially solventless coating composition containing sufficient pigment to obtain acceptable levels of hiding power is achieved by the presence of the carboxylic acid anhydride.

6 Claims, No Drawings

COATING COMPOSITIONS

This application is a continuation-in-part of Application Ser. No. 228,317, filed on Feb. 22, 1972 and now abandoned.

BACKGROUND

This invention relates to highly pigmented liquid compositions which are converted to solid coatings upon exposure to ultraviolet light.

This invention further relates to a method for preparing solid, pigmented coatings on a variety of substrates using liquid compositions containing specified epoxides, liquid carboxylic acid anhydrides, catalysts, and up to 50% by volume of one or more pigments. The compositions are solvent free, in that substantially no loss in weight occurs during conversion of the liquid composition to a solid coating.

Clear or lightly pigmented solid coatings exhibiting acceptable levels of hardness and solvent resistance are obtained by polymerizing epoxide-containing compositions in the presence of the Lewis acids produced when certain diazonium salts, i.e. the fluoroborates, are irradiated with ultraviolet light, as disclosed in U.S. Pat. No. 3,205,157. Up until now it has not been possible to utilize this technology to prepare commercially useful coatings containing sufficient pigment to obtain the high level of hiding power desired for many end-use applications.

If they are applied in sufficient thickness to obtain the desired level of hiding power, highly pigmented liquid compositions containing one or more epoxide monomers or oligomers as the sole or substantially sole reactive component of the liquid phase usually cannot be completely polymerized for form solid materials during an exposure to ultraviolet light in the presence of diazonium salts of Lewis acids as the polymerization catalyst. While surface of the coating may be dry to the touch following irradiation, the material below the surface is often either uncured or insufficiently cured to obtain a significant degree of adhesion to the substrate. In some instances the coating is readily separated from the substrate.

It is known that epoxides can be polymerized at elevated temperatures in the presence of various acidic and basic curing agents, including anhydrides of dicarboxylic acids. A relatively long heating period of several hours is usually required to obtain a solid polymer from compositions having a sufficiently long "pot life" or period of processability at ambient temperatures. This technology is therefore not applicable to the preparation of coatings, which usually must be converted to a dry, non-transferable material within several minutes or less after being applied to the substrate.

It has now been found that by replacing a portion of the epoxide component with a liquid comprising one or more anhydrides of di- or polycarboxylic acids, highly pigmented compositions are converted to hard, solid coatings following exposure times of ten seconds or less to ultraviolet light in the presence of certain aryl diazonium compounds. The coatings can be applied in a thickness sufficient to obtain the desired level of hiding power.

One objective of this invention is to provide pigmented liquid compositions containing epoxides and carboxylic acid anhydrides that can be applied to a variety of substrates and subsequently converted with substantially no loss in weight to a hard, durable coating of acceptable covering or hiding power following a short exposure to ultraviolet light.

A second objective of this invention is to provide a method for rapidly preparing hard, glossy, highly pigmented coatings from liquid epoxide resins.

SUMMARY OF THE INVENTION

The present invention pertains to liquid, pigmented coating compositions comprising one or more epoxides, carboxylic acid anhydrides, a catalyst, and up to 50% by volume of one or more pigments, said coating composition being rapidly polymerizable in the presence of ultraviolet light to yield solid products. The coating compositions are characterized by a. the presence of one or more epoxides selected from the group consisting of 1. liquid polyglycidyl ethers of the general formula

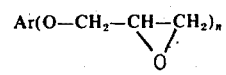

and low molecular weight liquid polymers thereof wherein Ar represents an aryl or alkaryl hydrocarbon radical and $n$ is the integer 2 or 3 and 2. liquid compounds containing two or more divalent radicals of the formula

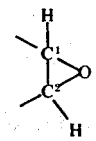

wherein $C^1$ and $C^2$ are part of a five- or six-membered carboxylic ring structure, which may in turn be part of a larger molecule;

b. the presence of one or more carboxylic acid anhydrides selected from the group consisting of liquid anhydrides of dicarboxylic acids, polycarboxylic acids and liquid mixtures containing two or more anhydrides of dicarboxylic or polycarboxylic acids, with the proviso that the composition contains 1.8 or more equivalent weights of epoxide per equivalent weight of acid anhydride;

c. the presence of a catalyst selected from the group consisting of aryl diazonium compounds corresponding to the general formula

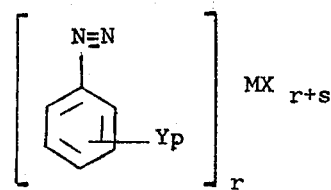

wherein X is halogen and M is an element selected from the group consisting of antimony, arsenic, bismuth, boron, iron, phosphorus and tin. Each Y is individually selected from the group consisting of nitro, hydroxyl, halogen, N-morpholino, alkyl, alkoxy, aryl, amino, arylamino, alkyamino and arylmercapto radicals; p is an integer between 1 and 5, inclusive; r is an integer equal to the absolute value of the charge on the complex anion $MX_{r+s}$ and s is an integer equal to the valence state of the element M.

DETAILED DESCRIPTION OF THE INVENTION

Liquid pigmented compositions that incorporate the epoxides, carboxylic acid anhydrides and catalysts of this invention are useful as coating materials for metal, paper, plastics and a variety of other substrates. When coatings of the liquid compositions are exposed for short periods of time to a suitable source of ultraviolet radiation, they develop a dry, glossy, non-tacky surface and an adherence to the substrate which is quite surprising considering the opacity imparted by the relatively large amount of pigment present in the composition. This ability to form dry coatings is not observed with compositions wherein the epoxide comprises substantially all of the liquid phase. The exposure time required to obtain a solid coating may be 10 seconds or less using the preferred compositions described in the following sections of this specification.

The Epoxide

One class of epoxides suitable for use in the present coating compositions are glycidyl ethers derived from compounds containing one or more hydroxyl groups which are bonded to carbon atoms of aromatic ring structures. This class of epoxides exhibits the general formula

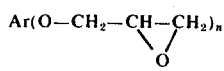

wherein Ar represents an aryl or alkaryl hydrocarbon radical and n represents an integer between 2 and 10, inclusive. The hydrocarbon radicals represented by Ar contain one or more aromatic hydrocarbon structures, e.g. phenyl and naphthyl radicals. If Ar contains a plurality of aromatic ring structures, these may be bonded directly to one another, as in a biphenyl radical. Alternatively, the ring structures may be separated by alkylene or other divalent radical, as in the compound 2,2-bis(4,4'-hydroxy-phenyl) propane, sometimes referred to as "Bisphenol A". The diglycidyl ether of Bisphenol A and liquid oligomers thereof which contain two or more repeating units per molecule are preferred for use in the present invention. Glycidyl ethers suitable for use in coating compositions exhibit viscosities of about 20,000 centipoises or less at ambient temperature.

Other useful epoxides of this class contain between 2 and 10 epoxide radicals

per molecule, e.g. the glycidyl ethers of phenol-formaldehyde novolac resins, and glycidyl ethers of compounds containing more than one hydroxyl radical bonded to an aromatic ring structure, e.g. resorcinol.

The second class of liquid epoxides suitable for use in the present coating compositions is one wherein the carbon atoms of at least one epoxide radical are part of a five or six-membered structure which may in turn be part of a larger molecule. Preferred compounds of this class include compounds of the formula:

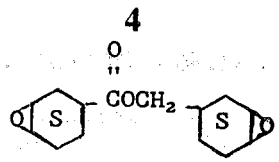

[3,4-epoxycyclohexylmethyl-(3,4-epoxy)cyclohexane carboxylate] and

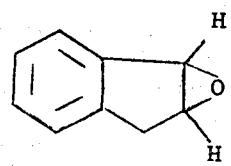

1,2-epoxyindan.

Compounds containing two or more epoxide groups are preferred for use in the pigmented coating compositions of this invention. The crosslinked structure which is attained following polymerization of these polyfunctional epoxides is considered essential for good appearance and high strength of the resultant coating.

The epoxides of both classes described hereinbefore may contain inert substituents, e.g. halogen, that will not react to any significant extent with the epoxide or other components of the coating composition at ambient temperature in the absence of compounds that catalyze epoxide polymerizations.

A number of useful commercially available epoxide monomers and oligomers are listed in Chapter 4 of the publication entitled "Handbook of Epoxy Resins" by H. Lee and K. Neville (McGraw-Hill Book Company, New York, 1967).

The Carboxylic Acid Anhydride

The pigmented coating compositions of this invention contain one or more liquid anhydrides of dicarboxylic or polycarboxylic acids. Some anhydrides of dicarboxylic acids which are solid at ambient temperature, e.g. maleic anhydride and hexahydrophthalic anhydride, when combined in specific proportions, will form eutetic mixtures which exhibit a melting point below ambient temperature. These mixtures are useful for the present coating compositions and are described in the chemical literature. Suitable anhydrides and eutetic mixtures include methyltetrahydrophthalic anhydride (a Diels-Alder condensation product of maleic anhydride and isoprene), dodecenylsuccinic anhydride and a mixture containing 30% by weight of maleic anhydride and 70% by weight of hexahydrophthalic anhydride.

The compositions of this invention contain 1.8 or more equivalent weights of epoxide per equivalent weight of acid anhydride. The use of excess epoxide is preferred. Depending upon the type of catalyst employed, experimental evidence indicates that a portion of the epoxide component undergoes a rapid homopolymerization during exposure of the catalyzed coating composition to ultraviolet light or heat. The time required for any significant reaction to occur between the epoxide and acid anhydride to form ester residues

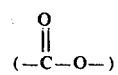

is considerably longer and may require several minutes to several days, depending upon the environmental temperature. An excess of epoxide is, therefore, desirable to ensure that a concentration of unreacted epoxide sufficient to react with substantially all of the anhydride will be present following the initial rapid hompolymerization of the epoxide component.

The Catalyst

The photosensitive catalysts of this invention are represented by the generic formula:

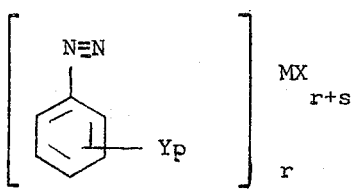

where X is halogen, M is a metal or metaloid selected from the group consisting of antimony, arsenic, bismuth, boron, iron, phosphorus and tin; and Y is selected from at least one of the group consisting of nitro, hydroxyl, halogen, N-morpholino, alkyl, alkoxy, aryl, amino, aryl amino, alkyl amino, and aryl mercapto radicals. In the above formula, it will be understood that r is equal to the number of free halogen atoms which are released upon the exposure of the catalyst to actinic radiation to yield a Lewis acid, $MX_s$, and that both the number of aryldiazonium radicals and the charge on the complex anion $MX_{r+s}$ is equal to $r$. The letter p represents an integer between 1 and 5.

Halogen-containing complex ions corresponding to all possible valence states of the element M may not exist, or may be so unstable as to be useless for all practical purposes; however, one skilled in the art can readily select those diazonium salts which would be suitable for use in the coating compositions of this invention. At least a partial listing of complex ions which can be incorporated into the present diazonium salts is found in Appendix III of the introduction to the subject index for Volume 56 (1962) of *Chemical Abstracts*, a publication of the American Chemical Society.

Specific examples of diazonium compounds which can be used in the present invention include:
p-chlorobenzenediazonium hexafluorophosphate
o-nitrobenzenediazonium hexafluorophosphate
2,5-dichlorobenzenediazonium hexafluorophosphate
p-N-morpholinophenyldiazonium hexafluorophosphate
2,5-diethoxy-4-(p-tolyl) benzenediazonium hexafluorophosphate
2-chloro-4-dimethylamino-5-methoxyphenyldiazonium hexafluorophosphate
2,5-diethoxy-4-p-tolymercaptobenzenediazonium hexafluorophosphate
2,5-dimethoxy-4-N-morpholinobenzenediazonium hexafluorophosphate
2,5-diethoxy-4-ethoxyphenylbenzenediazonium hexafluorophosphate
p-nitrobenzenediazonium hexafluoroarsenate
p-N-morpholinophenyldiazonium hexafluoroarsenate
2,4-dichlorobenzenediazonium hexachloroantimonate
p-nitrobenzenediazonium hexafluoroantimonate
p-N-morpholinophenyldiazonium hexafluoroantimonate
2,5-dichlorobenzenediazonium hexachloroantimonate
2,5-dichlorobenzenediazonium hexafluoroantimonate
2,4-dichlorobenzenediazonium tetrachlorobismuthate
o-nitrobenzenediazonium tetrachlorobismuthate
2,4-dichlorobenzenediazonium tetrachlorferrate
o-hydroxybenzenediazonium hexafluorophosphate
p-hydroxybenzenediazonium hexafluorophosphate
2,5-dichlorobenzenediazonium tetrafluoroborate The diazonium catalysts can be prepared using procedures known in the art, which are not considered part of the present invention. The chlorometallic complexes can be prepared, for example, in accordance with the method set forth by Lee et al. in *Journal of the American Chemical Society*, 83, 1928 (1961). diazonium hexafluorophosphates can be prepared by diazotizing the corresponding aniline derivative with $NOPF_6$, which in turn is prepared by the addition of $HPF_6$ or a hexafluorophosphate salt to a mixture of hydrogen chloride and sodium nitrite, or by the addition of a hexafluorophosphate salt to a solubilized diazonium salt to yield an insoluble product. The N-morpholino complexes can be prepared either from the aniline derivative or by adding an aqueous solution of the desired inorganic complex salt to a solution of N-morpholinophenyldiazonium fluoroborate.

The reaction which is believed to occur upon irradiation of diazonium catalysts with ultraviolet light can be represented by the following equation:

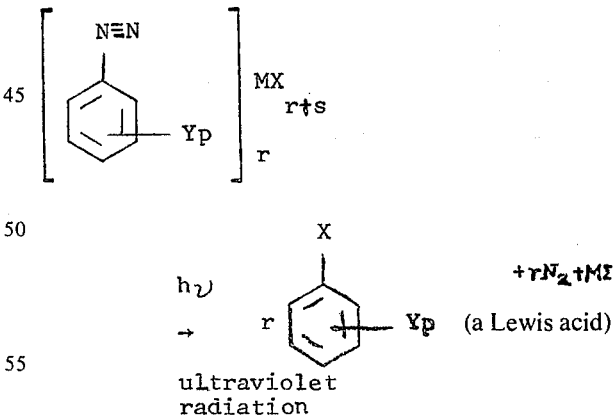

wherein the terms M, X, Y and the integers $p$, $r$, and $s$ have been defined previously. Exposure of the aryldiazonium catalyst to ultraviolet radiation of the proper energy level and wavelength yields a Lewis acid represented by the formula $MX_s$. The term Lewis acid refers to an electron pair acceptor such as $PF_5$, $FeCl_3$, $AsF_5$, $SbF_5$, $SnCl_4BF_3$, or $BiCl_3$. The Lewis acid initiates or catalyzes a rapid polymerization of the epoxide component of the coating composition.

The radiation employed to decompose the aryldiazonium compound can be generated using any suitable source, for example, a mercury or xenon lamp. The only limitation placed on the radiation source is that it must have a frequency range and energy level sufficient to decompose a major portion of the aryldiazonium compound.

Pigments

The coating compositions of this invention normally contain between about 10 and 30 volume % of one or more pigments. Titanium dioxide is a preferred pigment due to its high degree of hiding power. Opaque colored formulations are obtained by combining the titanium dioxide with relatively minor amounts of one or more colored pigments. To avoid premature polymerization of the epoxide, the pigments should not contain amino, hydroxyl or other radicals that react with epoxides and should not be excessively alkaline or acid. Zinc oxide is not a desirable pigment due to the high basicity of the compound.

The amount of pigment to be employed in a given formulation is a function of a number of variables, including the viscosity of the liquid phase (the epoxide-anhydride mixture), the degree of hiding power desired, the color of the formulation, the ability of the pigment to adsorb the liquid phase (as the level of adsorbancy increases, the amount of unadsorbed or "free" liquid phase decreases, which usually causes an increase in viscosity of the formulation), and the desired physical properties of the coating, such as flexibility, adhesion and film strength. Assuming that the other desired criteria can be met, additional hiding power can be achieved by increasing the pigment content of the formulation up to about 50 volume %, based on the total formulation. In these instances a pigment which is transparent to ultraviolet radiation, such as silica, is usually required in an amount that is at least equal to the difference between 30% by volume and the desired pigment content. In other words, if a pigment content of 45% by volume is desired, the concentration of transparent pigment should be at least 15% by volume, based on the total formulation. The reason for this requirement is that if conventional pigments are employed at levels above about 30% by volume, the resultant coating may be rendered sufficiently opaque to ultraviolet light so as to be incapable of undergoing a complete cure even during a relatively lengthy exposure of up to one minute or more to an ultraviolet light source.

If the pigment content of the coating is below 10% by volume, the degree of hiding power may be insufficient for many commercial applications.

Carbon black can be employed in the present formulations in combination with white pigments such as titanium dioxide. If used alone at even relatively low levels, carbon black may reduce the transmittance of the formulation to ultraviolet light sufficiently to partially or completely inhibit decomposition of the present diazonium catalysts as discussed in a preceding section of this specification. Decomposition of the catalyst is required to generate the Lewis acid which, in turn initiates curing of the coating composition.

At pigment concentrations above 50 volume %, the viscosity of the coating composition and the rigidity of the cured coating are usually above the limits which define commercially useful coatings and precursors.

Solvent

Some of the catalysts of this invention may not be readily soluble at ambient temperature in the epoxide, the anhydride or mixtures of these two components. Heating of the epoxide for any extended period of time should be avoided, since this may initiate an exothermic polymerization. To obtain a homogenous liquid composition it may therefore be necessary to dissolve the catalyst in a small amount of a liquid which may or may not be a reactive solvent, i.e. one which is incorporated into epoxide polymer molecules. The catalyst solvent comprises up to 5% by weight, preferably less than 2%, of the total coating composition.

Acetonitrile is a preferred solvent for the present diazonium catalysts, since in addition to dissolving the catalyst it is a weak Lewis base which will react with trace amounts of Lewis acids resulting from premature catalyst decomposition, thereby preventing spontaneous polymerization of the epoxide component in the absence of ultraviolet light. Other suitable solvents for the diazonium catalysts include propylene carbonate, benzonitrile, acetone, toluene, xylene and methyl ethyl ketone.

Preparation of the Coating Composition

The present compositions are conveniently prepared using a roller mill or other known techniques for obtaining uniform dispersions of pigments in liquid media. The pigment may be dispersed in the epoxide, anhydride, or a mixture of these two components.

The diazonium compound is added to the resultant mixture of pigment, epoxide and anhydride in an amount between about 0.25 to about 5 parts by weight of diazonium compound to each one hundred parts by weight of coating composition.

The catalyzed compositions of this invention can be coated onto a variety of substrates, including metal, paper, wood, and various synthetic polymers. The coatings are applied using known techniques, which include draw down bars, doctor blades, and roller coaters. To obtain an optimum combination of rapid application, film coherency and controllable thickness, the viscosity of the composition should be between about 5 and 5,000 centipoises at ambient temperature.

Polymerization of the Coating Compositions

Liquid pigmented coatings containing the present diazonium compounds are cured, i.e. converted to a hard, glossy, tack-free solid, during a relatively short exposure to an ultraviolet light source. The exposure time required to obtain a coating that is dry to the touch is a function of several variables, including coating thickness, pigment content, light intensity and type of diazonium compound. In many instances the exposure time is ten seconds or less, as will be demonstrated in the accompanying examples, which illustrate preferred coating compositions together with methods for preparing and polymerizing these compositions. The examples should not be interpreted as limiting the scope of this invention.

EXAMPLE 1

A homogeneous dispersion was prepared using 120 g. of titanium dioxide and 80 g. of 3,4-epoxy cyclohexylmethyl-(3,4-epoxy) cyclohexane carboxylate (available as ERL-4221 from the Union Carbide Corporation). An 8.25 g. portion of this material was blended with a mixture containing 1.25 g. of methyltetrahydrophthalic anhydride. To this composition was added a solution of 0.1 g. of 2,5-diethoxy-4-(p-tolyl mercapto) benzenediazonium hexafluorophosphate in 0.2 g. of acetonitrile. A portion of this composition was coated on a steel plate using a number 2 wire-wound "K-bar", and the coated side exposed for ten seconds at a distance of 3 inches (7.5 cm.) from a 430 watt mercury vapor lamp. During the exposure the liquid coating was converted to a white, opaque and glossy solid.

Acceptable quality coatings were prepared using the foregoing procedure and ingredients, the only change being the replacement of the diazonium catalyst with an equal weight of either o- or p-hydroxybenzene diazonium hexafluorophosphate.

EXAMPLE 2

A liquid coating composition was prepared using the procedue of Example 1 with the following ingredients:
4.0 g. of ERL-4221
2.5 g. of a liquid glycidyl ether of Bisphenol A
3.5 g. of methyltetrahydrophthalic anhydride
A solid coating was obtained following a ten second exposure to the radiation from a mercury vapor lamp using the method of Example 1.

EXAMPLE 3

A liquid coating composition was prepared as described in Example 1, with the exception that 2.5 g. of methyltetrahydrophthalic anhydride and 1.09 of dodecenyl-succinic anhydride was used as the acid anhydride component. The exposure time required to obtain a solid coating was ten seconds.

Examples 4, 5 and 6 are controls which demonstrate that poor coatings are obtained when the liquid compositions are outside the scope of this invention.

EXAMPLE 4

A homogeneous dispersion was prepared using 100 g. of titanium dioxide and 65 g. of 1,4-bis(2,3-epoxy-propoxy) butane. An 8.25 g. portion of this material was blended with 1.75 g. of methyltetrahydraphthalic anhydride. To this composition was added a solution of 0.1 g. of 2,5-diethoxy 4-(p-tolyl mercapto) benzene diazonium hexafluorophosphate in 0.2 g. of acetonitrile. Two steel plates were coated with this composition, the first plate using a number 1 wire-wound K-bar and the second plate using a number 2 wire-wound K-bar. Both plates were exposed for 20 seconds at a distance of 3 inches from a 430 watt mercury vapor lamp. Neither of the coatings were completely cured following the exposure.

To determine if the inability to cure the coating was due to the presence of pigment, an unpigmented coating formulation was prepared by blending a solution of 0.1 g. of p-chlorophenyl diazonium hexafluorophosphate in 0.2 cc. of acetonitrile with a homogeneous liquid mixture prepared by combining 6.5 g. of 1,4-bis(2,3-epoxypropoxy) butane with 3.5 grams of methyltetrahydraphthalic anhydride. A portion of the resultant composition was coated on a steel plate using a number 2 wire-wound K-bar, and the coated side of the plate was then exposed for 20 seconds at a distance of 3 inches from a 430 watt mercury vapor lamp. A tacky coating was obtained.

EXAMPLE 5

This example demonstrates that a useful pigmented coating composition cannot be prepared without a liquid carboxylic acid anhydride. A homogeneous dispersion was prepared using 120 g. of titanium dioxide and 80 g. of ERL-4221. An 8.25 g. portion of this material was blended with an additional 1.75 g. of ERL-4221. To this composition was added a solution containing 0.1 g. of 2,5-diethoxy-4-(p-tolyl mercapto) benzene diazonium hexafluorophosphate dissolved in 0.2 g. of acetonitrile. Two steel plates were coated with this composition, the first plate using a number 1 wire-wound K-bar, the second plate using a number 2 wire-wound K-bar. Both plates were then exposed for 20 seconds at a distance of 3 inches from a 430 watt mercury vapor lamp. The first plate, which exhibited a 0.0001 inch (0.0003 cm.)-thick coating, was completely cured. The second coating exhibited a thickness 0.0004 inch (0.001 cm.) and was cured only at the surface. Both coatings were considered unsatisfactory, the thinner coating because of insufficient hiding of the base metal, the second thicker coating because of insufficient adhesion to the metal substrate. The second coating could readily be removed from the metal substrate.

EXAMPLE 6

This example demonstrates that a useful, rapidly polymerizable coating composition cannot be prepared using a liquid acid anhydride without the diazonium compound, even though acid anhydrides are known to be effective curing agents for epoxide polymers. The formulation employed to prepare the coating was the same as that of Example 1, the only exception being omission of the diazonium catalyst, 2,5-diethoxy-4-(p-tolylmercapto) benzenediazonium hexafluorophosphate. A steel panel coated with this formulation using a number 2 wire-wound K-bar was placed 3 inches (7.5 cm.) from a 430 watt mercury vapor lamp with the coated side facing the lamp. The coating was still liquid following a sixty second exposure to radiation from the lamp. No significant change in the coating was observed after the coated panel was removed from the area of the lamp and allowed to remain at ambient temperature for one hour.

Examples 5 and 6 demonstrate that the rapid curing achieved using the present combination of a diazonium compound and liquid acid anhydride does not result from a simple additive effect obtained by combining two known curing agents for epoxide polymers. Neither the diazonium compound nor the anhydride when used alone is cable of promoting satisfactory curing of pigmented epoxide-containing coating materials in the presence of ultraviolet radiation.

What is claimed is:
1. An improved pigmented liquid composition which is rapidly polymerizable to form solid coatings upon exposure to ultraviolet light at ambient temperature, the liquid composition comprising at least one epoxide, a pigment which is present at a concentration (Cp) of between 10 and 50% by volume, based on said composition, and between 0.25 and 5% by weight of a diazonium compound of the general formula

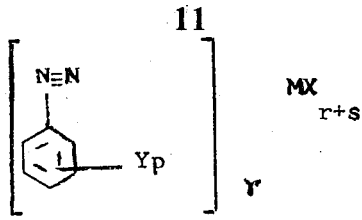

wherein X represents a halogen radical and M represents an element selected from the group consisting of antimony, arsenic, bismuth, boron, iron, phosphorus and tin; Y is selected from at least one of the group consisting of nitro, hydroxyl, halogen, N-morpholino, alkyl, alkoxy, aryl, amino, arylamino, alkyamino and arylmercapto radicals, $p$ is an integer between 1 and 5, inclusive, $r$ is an integer equal to the absolute value of the charge on the complex anion $MX_{r+s}$ and s is an integer equal to the valence state of M wherein the improvements consist of:
  a. the presence of at least one liquid epoxide selected from the group consisting of:
    1. those exhibiting the general formula

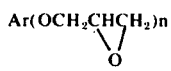

and low molecular weight telomers thereof wherein Ar represents an aryl or alkaryl hydrocarbon radical, $n$ is the integer 2 or 3,
    2. compounds containing at least two epoxide radicals of the formula

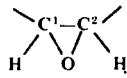

wherein $C^1$ and $C^2$ form part of a five- or six-membered carboxylic ring structure, said epoxide comprising the entire liquid epoxide component or a major fraction thereof, and
  b. the presence of at least one carboxylic acid anhydride selected from the group consisting of liquid anhydrides of dicarboxylic acids, polycarboxylic acids and liquid mixtures containing two or more anhydrides of dicarboxylic or polycarboxylic acids with the proviso that the liquid composition contains at least 1.8 equivalent weights of epoxide per equivalent weight of acid anhydride.

2. The liquid composition of claim 1 wherein the carbon atoms of the epoxide radical

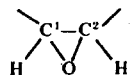

are part of a 6-membered carboxylic ring.

3. The liquid composition of claim 1 wherein the epoxide is a liquid diglycidyl ether of Bisphenol A [2,2-bis(4,4'-hydroxyphenyl) propane].

4. The liquid composition of claim 1 wherein the acid anhydride is selected from the group consisting of methyltetrahydrophthalic anhydride and liquid mixtures of methyltetrahydrophthalic anhydride and dodecenylsuccinic anhydride.

5. A liquid composition as claimed in claim 1 which contains up to 5% by weight of a solvent for the diazonium compound.

6. The liquid composition of claim 1 wherein the pigment content (Cp) is between 30 and 50% by volume and a pigment transparent to ultraviolet light is present in an amount equal to Cp-30%.

* * * * *